United States Patent [19]
Stinson

[11] 3,876,016
[45] Apr. 8, 1975

[54] METHOD AND SYSTEM FOR DETERMINING THE POSITION OF AN ACOUSTIC GENERATOR IN A BOREHOLE

[75] Inventor: Leon B. Stinson, Houston, Tex.

[73] Assignee: Hughes Tool Company, Houston, Tex.

[22] Filed: June 25, 1973

[21] Appl. No.: 373,205

[52] U.S. Cl. .............. 175/45; 166/255; 181/.5 BE; 175/56; 73/151.5
[51] Int. Cl............................................. E21b 47/02
[58] Field of Search .............. 175/45, 40, 61, 50, 1, 175/56; 181/.5 BE, .5 R, .5 P, .5 H, .5 NP; 166/255, 254, 250; 73/151, 151.5

[56] References Cited
UNITED STATES PATENTS

| | | | |
|---|---|---|---|
| 2,062,151 | 11/1936 | Weatherby | 175/1 X |
| 2,089,983 | 8/1937 | Ricker | 166/254 X |
| 3,285,350 | 11/1966 | Henderson | 175/40 X |
| 3,405,770 | 10/1968 | Galle et al. | 175/56 |
| 3,441,094 | 4/1969 | Galle et al. | 175/56 |
| 3,722,605 | 3/1973 | Isham | 175/40 |
| 3,729,702 | 4/1973 | Beeken et al. | 181/.5 NP |
| 3,739,871 | 6/1973 | Bailey | 166/250 |

*Primary Examiner*—Frank L. Abbott
*Assistant Examiner*—Richard E. Favreau
*Attorney, Agent, or Firm*—Robert A. Felsman

[57] ABSTRACT

The specification discloses a method and system for determining the position of a drill bit employed in drilling a borehole in the formations through employment of an acoustic vibration oscillator adapted to be operated by fluid pumped down a tubing or drill string and acoustically coupled with a cavity, a portion of which is defined by the walls of the borehole. In operation, fluid is pumped down the drill string to the oscillator located near the drill bit to generate acoustic vibrations which are detected at the surface by a plurality of spaced detectors. The outputs of the detectors are recorded and the waveforms of the outputs recorded are compared to determine the phase differences of the acoustic signal arriving at the plurality of detectors for determining the position of the drill bit. Detection may be carried out while the drill bit is being rotated or rotation of the drill string may be temporarily halted when making seismic recordings whereby the position of the osillator and hence the position of the bit may be determined continuously or at discrete intervals as the borehole is drilled. This method and system may also be used for surveying a hole which has been previously drilled.

11 Claims, 7 Drawing Figures

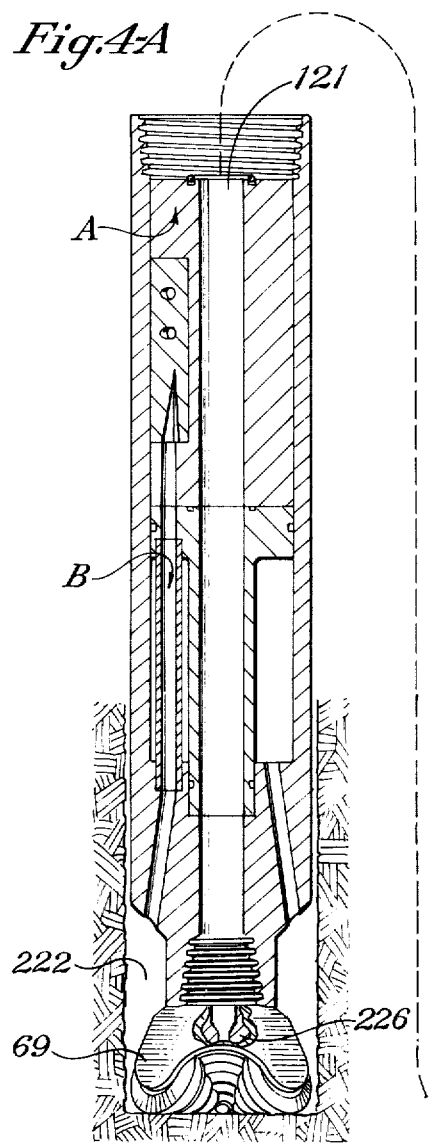
Fig.4-A
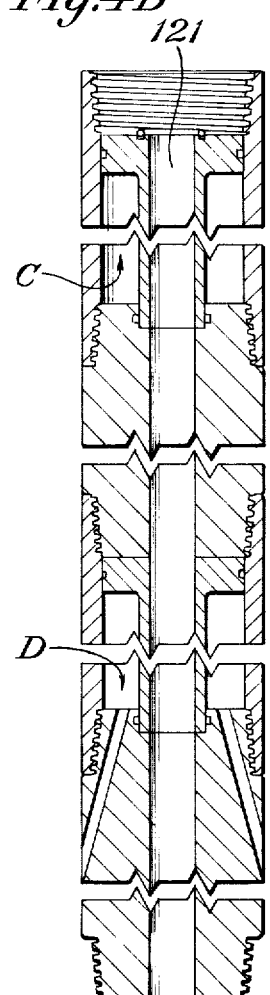
Fig.4-B
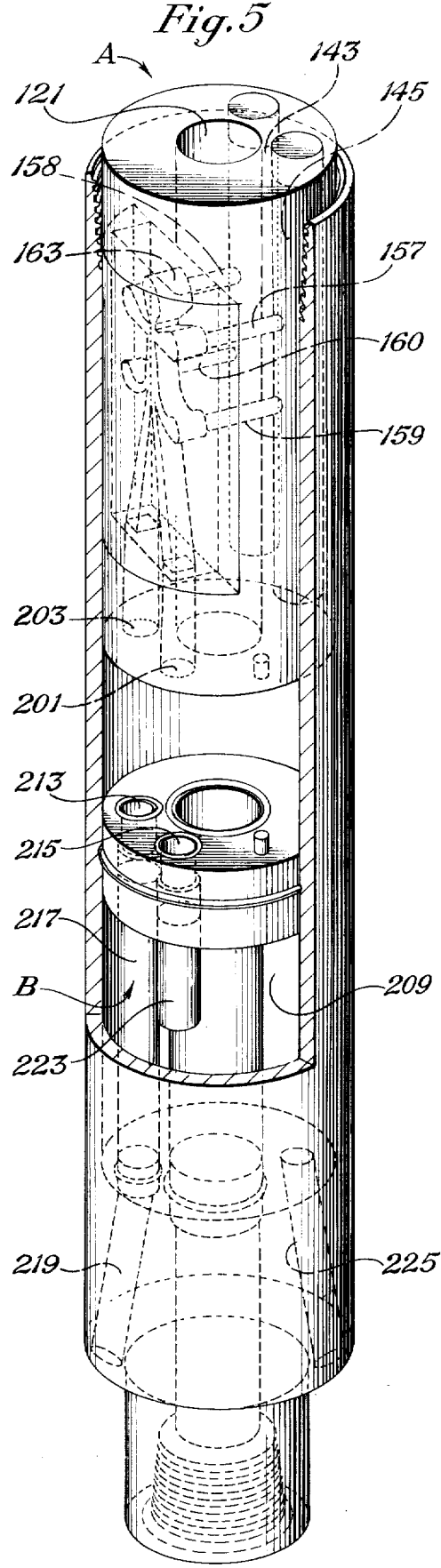
Fig.5
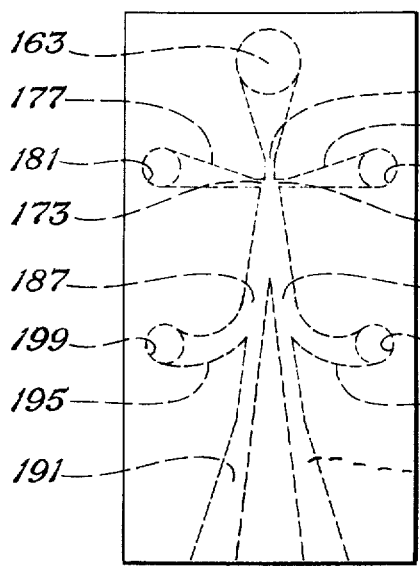
Fig.6

3,876,016

METHOD AND SYSTEM FOR DETERMINING THE POSITION OF AN ACOUSTIC GENERATOR IN A BOREHOLE

BACKGROUND OF THE INVENTION

1. Field of the Invention

This invention relates to a method of and system for determining the three dimensional position of the bottom or selected points in a borehold and which permits these positions to be determined continuously or at discrete intervals as the borehold is advanced.

2. Description of the Prior Art

In conventional rotary drilling operations, the direction and position of the bottom of or other selected points in a borehole with respect to its surface location are determined by suspending drilling operations and lowering suitable tools into the borehole to obtain the desired information.

In U.S. Pat. No. 2,062,151, there is disclosed the use of an impact or reciprocating bit for carrying out drilling operations and a method of determining the position of the bottom of the borehole relative to its surface location by detecting at the surface the elastic waves produced by impact of the bit on the bottom of the borehole. Also mentioned in this patent is the use of the sound produced by the action of a rotary cutting tool on the formation in which it is drilling as the source of seismic waves for carrying out the disclosed process of determining the position of the bottom of the borehole.

In actual practice, the sound level produced by the action of a rotating drill bit on the formations is unsatisfactory as a source of seismic waves for determining the position of the borehole bottom particularly in the presence of the noise generated by the surface equipment and the action of the drill string in rotating the drill bit. Hence it would be difficult if not impossible to detect at the surface and distinguish from the noise, the sound produced by the action of the drill bit on the formations particularly at increasing depths.

In U.S. Pat. No. 3,405,770, there is disclosed a rotary drilling system employing an acoustic vibration oscillator for generating large pressure variations in a borehole for increasing drilling rates. The acoustic vibration oscillator is operted by fluid pumped down the drill string and has an output acoustically coupled to the fluid in the cavity surrounding the bit. The vibrations may be confined to a selected zone in the borehole by the disclosed acoustical system.

SUMMARY OF THE INVENTION

The acoustic vibrations generated by the acoustic vibration oscillator disclosed in U.S. Pat. Nos. 3,441,094 and 3,405,770 are of very large amplitude and may be detected at the surface and distinguished from other noise. Thus by employing such an oscillator as a sound source, information may be obtained at the surface for determining the position of the bottom or other selected points in a borehole.

Accordingly, it is an object of the present invention to provide an improved method for determining the position of the bottom or other selected points in a borehole by fluidically generating, with fluid pumped down the borehole, an acoustic signal in the borehole for detection at the surface at a plurality of positions spaced apart sufficient to obtain phase difference in the signals detected.

It is another object of the present invention to provide an improved method and system for determining the position of a drill bit utilizing an acoustic vibration oscillator adapted to be operated by fluid pumped down the borehole to generate an acoustic signal in the borehole near the drill bit for detection at the surface by a plurality of spaced detectors.

It is another object of the present invention to provide an improved method and system wherein the acoustic vibration oscillator is employed as a sound source for determining continuously or at discrete intervals the position of a rotary drill bit as the borehole is drilled.

It is a further object of the present invention to employ the acoustic vibration generator in a rotary drilling system to increase drilling rates and to provide a sound source for generating acoustic vibrations near the vicinity of the drill bit for detection at the surface by a plurality of spaced detectors whereby the phase differences of the outputs of the detectors may be employed for determining the position of the drill bit.

In operation of the method and system, fluid is pumped down the borehole to the oscillator to generate acoustic vibrations in the borehole and which are detected at the surface by a plurality of spaced detectors. The outputs of the detectors are recorded and the waveforms of the recorded outputs are compared to determine the phase difference of the signals arriving at the various spaced detectors.

When the acoustic vibration generator is employed to increase drilling rates the acoustic vibrations generated may be detected and recorded continuously as drilling proceeds or rotation of the drill string may be temporarily halted when making recordings whereby the position of the bit may be determined continuously or at discrete intervals as the borehole is drilled.

BRIEF DESCRIPTION OF THE DRAWINGS:

FIG. 4-A and 4-B are longitudinal section views illustrating the acoustic vibration generator, coupling device, and related equipment;

FIG. 5 is a perspective view of a portion of the apparatus shown in FIG. 4-A, with a portion thereof broken away to expose its interior. The upper, acoustic vibration generator portion of the apparatus is shown lifted from the normal operating position of FIG. 4-A to add clarity to the drawing; and FIG. 6 is a view of a portion of the acoustic vibration oscillator which is one component of the apparatus shown in FIGS. 4 and 5.

DETAILED DESCRIPTION OF THE INVENTION

Figure 1:
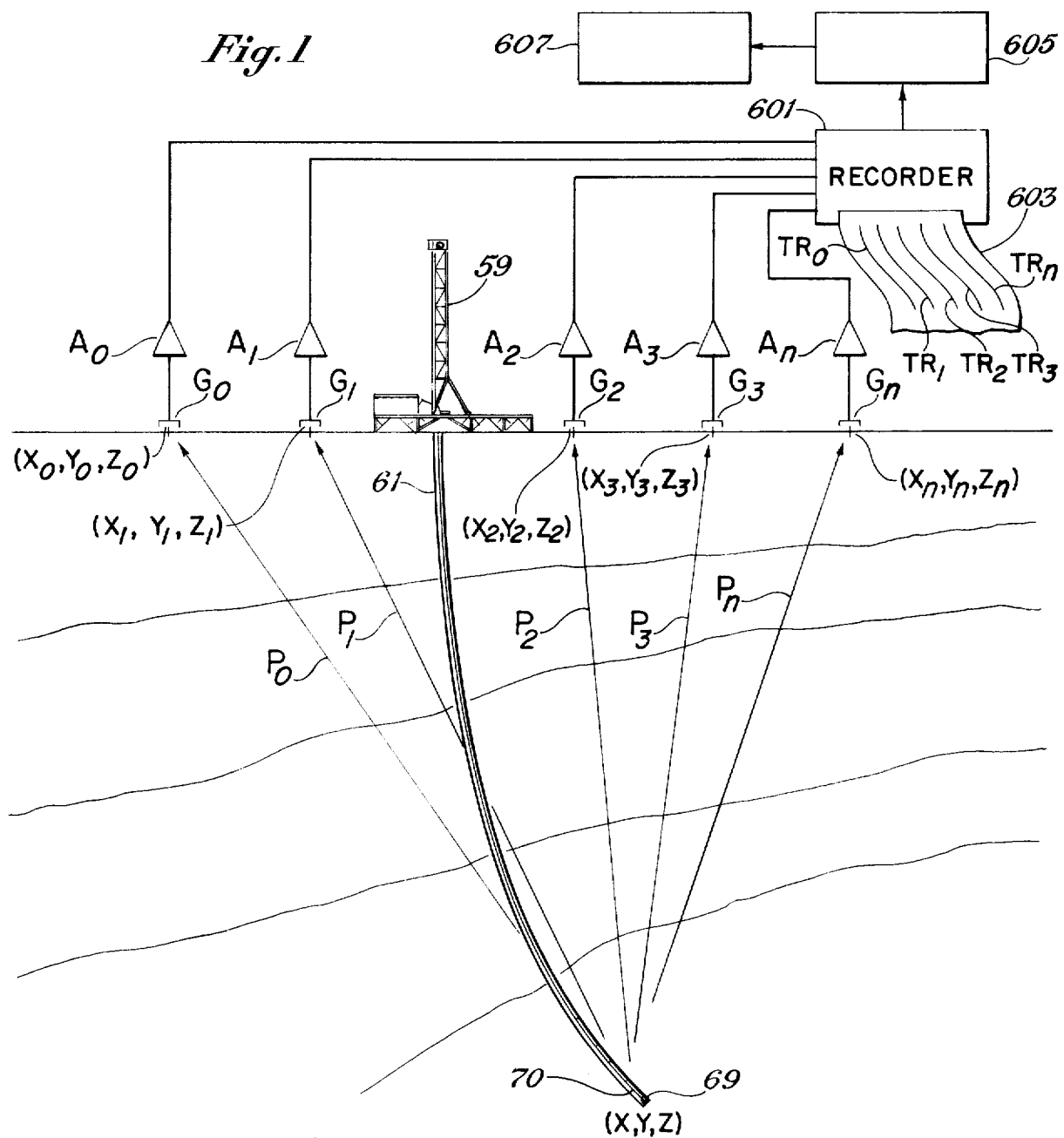
FIG. 1 illustrates a rotary drilling system and a plurality of spaced seismic detectors located at the surface and coupled to a recording system for detecting and recording acoustic vibrations generated downhole near the drill bit and hence near the bottom of the borehole.
Figure 2:
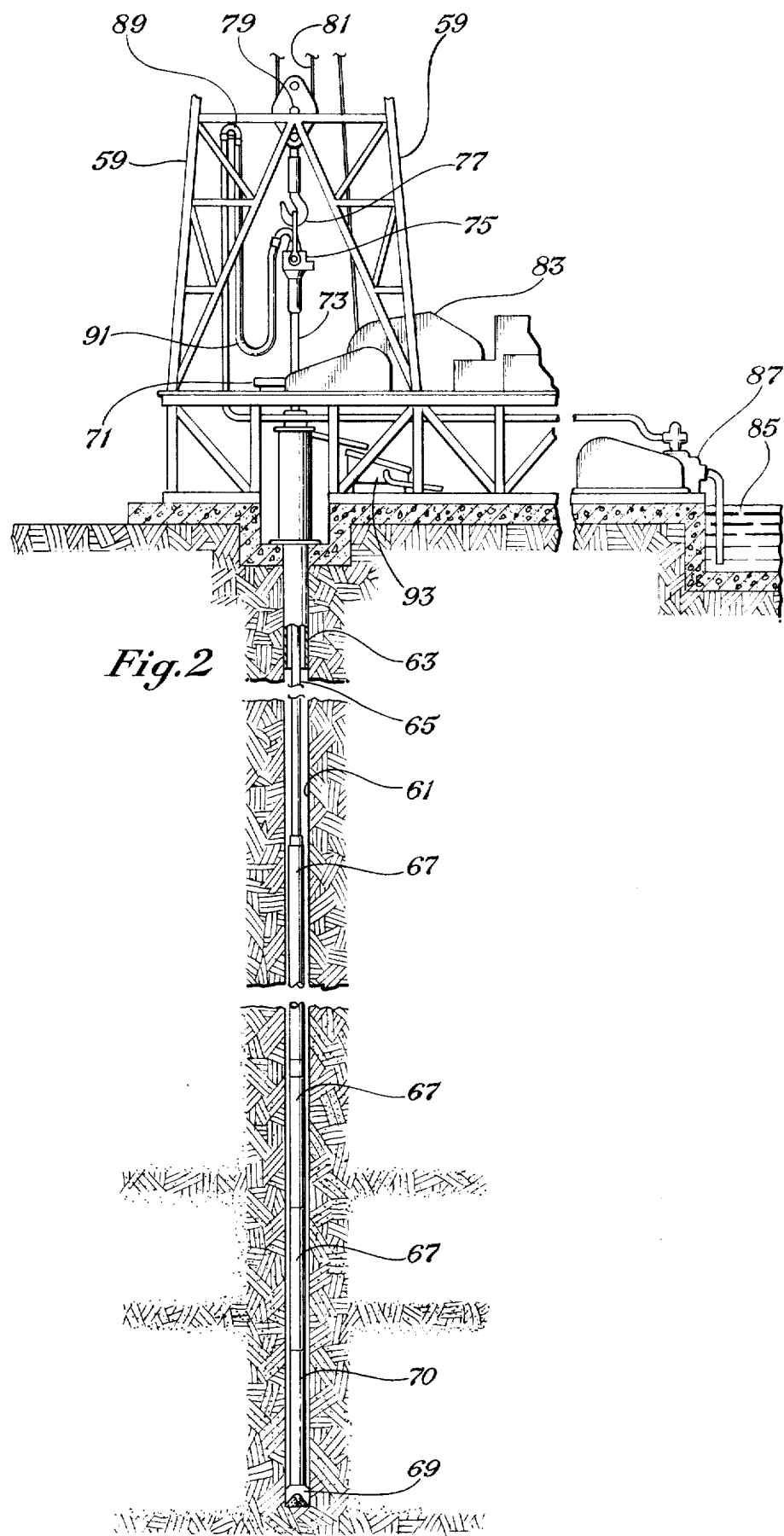
FIG. 2 illustrates more detail of the rotary drilling system having an acoustic vibration generator employed to enhance drilling operations and which is also employed as a sound source to enable the position of the drill bit to be determined while the borehole is being drilled.

Referring now to FIGS. 1 and 2, there will be described the rotary drilling system employing the acoustic vibration generator or oscillator to improve drilling rate and which also is employed as a sound source to enable the position of the drill bit to be determined while drilling. The numeral 59 designates a derrick located over a borehole 61 that contains surface casing 63, drill pipe 65, drill collars 67, and a drill bit 69. The acoustic vibration generator is identified at 70 and is normally connected in the drill string directly above the bit.

Rotation of the bit 69 is achieved by the engagement of a rotary table 71 with a kelly 73, which is the uppermost tubular member of the drill string. The rate at which the drill bit 69 is rotated varies and may fall within the range for example of from 30 to 250 rpm, depending upon the type of formation in which drilling is carried out. The kelly 73 is attached to a swivel 75 which is supported in the derrick 59 by hook 77, traveling block 79 and cable 81. The cable 81 is attached through pulleys at the top of the derrick (not shown) to the draw-works 83, which raises and lowers the drill string.

The fluid circulation system consists of a sump, or mud pit, 85 from which drilling fluid is drawn by means of a mud pump 87. The fluid travels to standpipe 89 in derrick 59, through hose 91, down kelly 73, and ultimately to drill bit 69. Cuttings from the bottom of the hole are washed by the fluid up through borehole 61 outside of the drill string, and are then separated from the fluid by a shale shaker 93. The fluid then returns to sump 85 where the circulatory process is repeated.

Referring now to FIGS. 4-A, 4-B, 5 and 6, the acoustic vibration generator is designated by letter A and may be referred to as a "fluidic" generator device in that it has no moving mechanical components. It is a high gain, bi-stable, fluidic amplifier with positive feedback to cause oscillations of the bi-stable unit. Also provided is a coupling device B which couples the output of the acoustic vibration generator with the drilling fluid located in an acoustic tank or cavity 222 surrounding the drill bit 69. As illustrated, the outer limits of the cavity 222 are defined by the borehole walls. Also provided are a pair of Helmholtz resonators designated by letters C and D. The acoustic vibration generator A, the coupling device B, and the Helmholtz resonators C and D are fully described in U.S. Pat. No. 3,405,770. A brief description however will be given as to the manner of operation of the drilling system including the acoustic vibration generator A and the coupling device B.

In operation, drilling fluid is pumped through the drill string and flows through the axial bore 121, through the bit nozzles 226 and flushes cuttings from the bottom of the borehole and carries them up the annulus between the drill string and the borehole walls to the surface.

A portion of the fluid flowing through the axial bore 121 (see FIGS. 4-A and 5) is diverted through a supply port or inlet passage 163 of the oscillator A. From input 163, the fluid flows from a power nozzle 167 (see FIG. 6) and alternatively flows into receiver channels 185 and 187. This alternating flow results from the positive feedback effected by feedback channels 193, 195; feedback ports 197,199; apertures 159, 160; cavities formed in the axial bores 143,145; apertures 157, 158; control ports 179, 181; passages 175, 177; and control nozzles 171,173. During each half-cycle of oscillation, a majority of the fluid entering the receiver channels 185 or 187 flows into either diffuser channel 189 or 191 and to the outlet 201 or 203 of the acoustic vibration generator A.

The output of the diffuser channel 191 and outlet 203 feeds aperture 213, tube 217 and aperture 219, which together with the fluid therein constitute an acoustic inertance. Aperture 219 communicates with the fluid in the cavity 222 surrounding the bit, the cavity 222 being in effect an acoustic compliance. The output of the diffuser channel 189 and outlet 201 feeds aperture 215 and tube 223 which constitute another acoustic inertance. Tube 223 terminates with annular cavity 209 which constitutes another acoustic compliance. Aperture 225 is an acoustic inertance communicating between annular cavity 209 and the cavity 222 surrounding the drill bit. To improve the reliability of oscillation on-set under high back pressure conditions, it is advantageous to insert flow restrictions in diffuser channels 189 and 191. However, the openings of the restrictions should be made as large as possible to minimize power loss. By suitable dimensioning of all the acoustical elements with the acoustical coupling circuitry, there are accomplished three objectives: (1) proper matching of the output impedance of the oscillator A with the dissipative load imposed by the bit nozzles; (2) effective phase inversion of the vibrations in one of the output legs of the oscillator A and; (3) the provision of a high Q system. Hence the acoustic generator may be utilized to effect large pressure variations in the borehole fluid near the bottom of the borehole to increase the drilling rate when using otherwise conventional rotary drilling techniques. The pressure variations may have a peak-to-peak amplitude of up to about 2,000 psi and may be generated in one embodiment at an average frequency of about 100 cycles per second. Since the energy generated by the generator A is of large magnitude, the acoustic vibrations also may be detected and recorded at the surface by suitable equipment and employed to determine the position of the drill bit 69 and hence the position of the bottom of the borehole as drilling proceeds.

Figure 3:
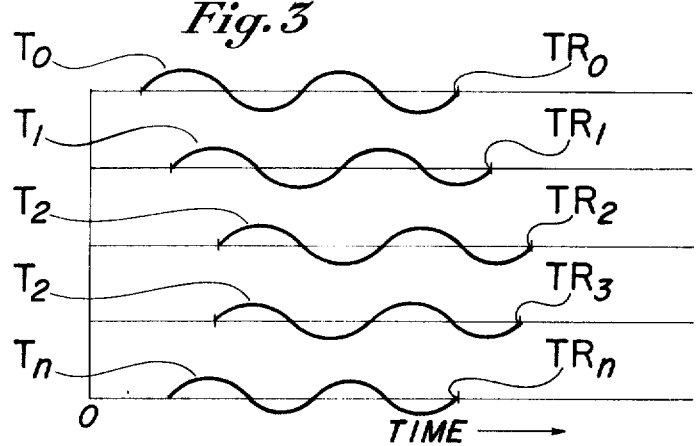
FIG. 3 illustrates waveforms detected and recorded by the detection and recording system of FIG. 1.

Referring to FIG. 1, the detecting system in one embodiment comprises five spaced seismic detectors (geophones) illustrated at $G_o$, $G_1$, $G_2$, $G_3$ ..., $G_n$ and coupled to the ground for detecting the waveform of acoustic vibrations generated by the vibrator 70 and arriving at the detectors by way of travel paths depicted by arrows $P_o$, $P_1$, $P_2$, $P_3$, ..., $P_n$. Although only five detectors are illustrated, it is to be understood that more may be employed as will be pointed out subsequently. The outputs of the detectors are applied by way of amplifiers $A_o$ through $A_n$ to a recorder 601 which may record the outputs in digital or analog form. In FIG. 1, the recorder 601 is illustrated as recording the outputs in analog form as as continuous traces $TR_o$, $TR_1$, $TR_2$, $TR_3$, ..., $TR_n$ on the chart 603 which is driven at a constant speed as recording is carrried out. Portions of these traces are illustrated in FIG. 3.

Since the acoustic signals generated by the vibrator 70 are of large magnitude, they may be detected at the surface by the detectors and readily distinguished from noise from the surface equipment or from the rotation of the drill string, etc. Preferably, rotation of the drill string and drill bit will be temporarily halted during the detecting process, in order to insure stable frequency operation of the acoustic vibration generator 70 during the recording interval.

The detectors $G_o, G_1, G_2, G_3, \ldots, G_n$ are spaced apart at the surface sufficient that a characteristic point of the acoustic waveform from the generator 70 will reach the detectors at different times whereby phase differences will occur between the signal outputs produced by the detectors. For example, referring to FIG. 3, the peak amplitudes of the positive excursions of the waveforms occur at different times $T_o, T_1, T_2, T_3, \ldots, T_n$. These times represent the arrival times of peak amplitudes to the detectors $G_o$ through $G_n$ from the generator 70. These phase differences can be medasured either manually or by electronic equipment illustrated at 605. The waveforms detected and recorded thus may be compared to determine phase differences between the signals in order to determine and compute the various positions of the drill bit as it penetrates the earth. The computations may be carried out at the well site with the use of suitable electronic or digital computing instrumentation illustrated at 607. Hence the position of the drill bit and thus the bottom of the borehole may be determined during drilling operations either continuously as drilling proceeds or at discrete intervals as the borehole is drilled.

The mathematics employed in determining and computing the position of the drill bit will now be described in conjuction with the following definitions:

$G_o, G_1, \ldots G_n$ — $x + 1$ seismic detectors spaced in the vicinity of the top of a borehole.

$(x_o, y_o, z_o), (x_1, y_1, z_1), \ldots, (x_n, y_n z_n)$, —coordinates of seismic detectors $G_o, G_1, \ldots, G_n$ respectively in some reference frame; for example, a Cartesian coordinate system with principal axes X, Y, Z. The origin of the coordinate system may be at any convenient location, of for example at $(x_o, y_o, z_o)$. Also, for convenience, let one of the principal axes (Z, for example) pass through the center of the earth and be positive downward.

$(x, y, z)$ —coordinates of the seismic source, 70.

$P_o, P_1, \ldots, P_n$ —seismic paths between the seismic source and detectors $G_o, G_1, \ldots, G_n$ respectively.

$d_o, d_1, \ldots, d_n$ —lengths of paths $P_o, P_1, \ldots, P_n$ respectively.

$T_s$ —The time at which some characteristics of a seismic wave leaves the semismic source.

$T_o, T_l, \ldots, T_n$ —The time at which the characteristics of the wave which left the source at $T_s$ reaches detectors $G_o, \ldots, G_n$ respectively.

$t_o, t_l, \ldots, T_n$ —The time required for a seismic wave (acoustic vibration) to travel from the seismic source to detector $G_o, G_1, \ldots, G_n$ respectively.

Then, $t_o = (T_o - T_s), t_1 = (T_l - T_s), \ldots, t_n = (T_n - T_s)$.

Assuming that the average seismic, or acoustic, velocity is the same for each path $P_o, P_1, \ldots, P_n$, and calling that velocity $v$, the following n+1 equations can be written:

$$d_i - v t_i = 0 \tag{1}$$

$= 0, 1, 2, \ldots, n$

Although the paths $P_i$ are not necessarily straight lines, the following substitution can be made with minimal error in the solution.

$$d_i = [(x-x_i)^2 + (y-y_i)^2 + (z-z_i)^2]$$

Subtracting each of the equations (1) from itself and from each of the other equations one at a time produces a set of $(n+1)^2$ equations of the form:

$$d_i - d_j - v(t_i - t_j) = 0 \tag{3}$$

$i = 0, 1, 2, \ldots, n$
$j = 0, 1, 2, \ldots, n$

Substituting for $t_i$ and $t_j$ in these equations gives: $d_i - d_j - v(T_i - T_j) = 0$ The $(T_i - T_j)$ can be determined from the measured phase differences between acoustic vibrations detected at $G_i$ and $G_j$. This set of $(n+1)^2$ equations contains $(n+1)^{n-1}$ subsets of $n$ independent, non-trivial equations. Any of these subsets may be solved to determine the location of the seismic source. For example, the following subset may be used:

$$d_i - d_o - v(T_i - T_o) = 0 \tag{5}$$

$= 1, 2, \ldots, n$

With $n = 4$ (5 detectors), a unique set of values for $x, y, z$, and $v$ can be found which satisfy the equations. Because of measurement inaccuracies, it may be desirable to use a larger number of detectors and solve the resulting over determined set of equations in some "best fit" sense to improve the acurracy of the solution. However, for $n > 4$, there is no solution in general, which will satisfy all the equations. It is convenient to rewrite the equations as residue equations.

$$r_i = [(x-x_i)^2 + (y-y_i)^2 + (z-z_i)^2]^{1/2} - [(x-x_o)^2 + (y-y_o)^2 + (z-z_o)^2]^{1/2} - v(T_i - T_o) \tag{6}$$

$i = 1, 2, \ldots, n$

Then for $n = 4$, a unique solution can be found for which $r_1 = r_2 r_3 = r_4 = 0$. For $n > 4$ there is no solution, in general, for which all $r_i = 0$. There are numerous mathematical methods which can be used to find solutions to the set of equations by minizing the $r_i$ in some manner, thereby solving the equations in some "best fit" sense. For example, minimization of the scaler function $$p = r_1^2 + r_2^2 + \ldots + r_n^2$$

results in a least squares solution. Most techniques for minimizing functions involve an iterative scheme which converges to the solution values from an initial estimate of the solution. To improve convergence, it may be necessary in some instances to impose constraints on the solution. The following are examples of constraints which may be applicable. If the top of the borehole is at coordinates $(x_h, y_h, z_h)$ and the length of the drill string to which the seismic source is attached is S, then the constraint $$C_1 \le [(x-x_h)^2 + (-y_n)^2 S (z-z_h)^2]^{1/2} - S$$

constrains the location, $(x, y, z)$, of the seismic source to be on the surface of or within a sphere of radius S centered at the top of the borehole.

$$C_2 \le Z_h - Z$$

constrains $(x, y, z)$ to be below the top of the borehole. In some circumstances it may be desirable to constrain $(x, y, z)$ to be on the surface of or outside a sphere of radius $R$, where R has been determined from prior solutions elsewhere in the borehole or is otherwise known. Then the constraint $$C_3 \leq R - [(x-x_h)^2 + (y-y_h)^2 + (z-z_h)^2]^{1/2}$$

along with $c_1$ constrains $(x,y,z)$ to a spherical shell of inner radius $R$ and outer radius $S$. Upper and/or lower bounds for $v$, if known, may be imposed on $v$ with the constraints $$C_4 \leq v_{min} - v$$
$$C_5 \leq v - v_{max}$$

where $v_{max}$ and $v_{min}$ are the upper and lower bounds respectively. One of the numerous methods for solving the equations to determine the position of the seismic source is a gradient method using scaled gradients. This method will now be described.

Let $\bar{U}$ be the solution vector $\begin{pmatrix} u_1=x \\ u_2=y \\ u_3=z \\ u_4=v \end{pmatrix}$ $\bar{U}_k$ be the current estimate of $\bar{U}$
$\bar{S}$ be the column vector, the elements of which are
$S_i = r_i$
$i = 1, 2, \ldots, n$
$S_i = c_{i-n}$
$i = n+1, n+2, \ldots, n+m$ where $m$ is the number of constraints. The equations are transformed into the scaler function (7) $\quad p(\bar{U}_k) = \bar{S}^T \bar{S} = \sum_{i=1}^{n+m} S_i^2$ The scaled gradient of $p(\bar{U}_k)$ is evaluated as follows:

(8) $\quad \bar{G}_p = -2[D_k] [J]^T [D_s] \bar{S}$ where:
$[D_k]$ is the scaling matrix $$\begin{bmatrix} x_k & 0 & 0 & 0 \\ 0 & y_k & 0 & 0 \\ 0 & 0 & z_k & 0 \\ 0 & 0 & 0 & v_k \end{bmatrix}$$

$[J]$ is the Jacobian of $\bar{S}$, the elements of which are $$j_{i,l} = \frac{\delta s_i}{\delta u_l}$$

and $[D_s]$ is a strategy matrix which allows a constraint to influence the gradient only if the constraint inequality is not satisfied. The elements of $[D_s]$ are $$d_{i,j} = \begin{cases} 1 & i = j \leq n \\ s_i + |s_i| & i = j > n \\ 2s_i & \\ 0 & i \neq j \end{cases}$$

The normalized gradient
(9) $\quad \bar{N} = \bar{G}_p / |\bar{G}_p|$
is used in the search algorithm
(10) $\quad \bar{U}_{k+1} = \bar{U}_k + [H_k][D_k]\bar{N}$
where:
$k$ denotes current values
$k+K+1$ denotes the improved estimate
$[H_k]$ is a "step size" matrix which specifices the allowable change in each element of the solution for each iteration.

$$[H_k] = \begin{bmatrix} h_x & 0 & 0 & 0 \\ 0 & h_y & 0 & 0 \\ 0 & 0 & h_z & 0 \\ 0 & 0 & 0 & h_v \end{bmatrix}$$

Strategies are placed on $[H_k]$ such that if the algorithm is moving in essentially a constant direction for an element of $\bar{U}$, then h for that element is large. If the algorithm beings oscillating about a value for one of the elements of $\bar{U}$, then the corresponding h is reduced on each interation. When all diagonal elements of $[H_k]$ to have been reduced below a preset value, convergence is assumed. Gradient methods are not absolutely convergent but this method will coverge to a close neighborhood of the solution.

While the invention has been described with reference to only one type of apparatus, it should be understood that it is not to be thus limited but is susceptible to various changes and modifications without departing from the spirit thereof. The method may be used apart from drilling, as when surveying a hole. In such instance apparatus such as shown in U.S. Pat. No. 3,441,094 may be effectively utilized to prevent loss of acoustic energy upward or downward through the borehole.

I claim:

1. A method of determining the position of an acoustic generator in a borehole:
    fluidically generatign, generating fluid pumped down the borehole, an acoustic signal in the borehole;
    said acoustic signal generated having predominantly a single frequency;
    at the surface, simultaneously detecting said signal at a plurality of different positions spaced apart sufficient to obtain phase differences in the signals detected at said different postions;
    recording the signal detected at each position; and
    comparing the waveforms of the signals recorded to determine phase differences of the signals detected at said different postions.

2. The method of claim 1 wherein the signal generated has a continuous waveform.

3. The method of claim 1 wherein said acoustical signal is generated by the step of:
    diverting at least a portion of the fluid flowing down the borehole into two channels;
    switching alternatively fluid flow from one channel to another to generate out-of-phase outputs;
    inverting the phase of one output to match the phase of the other output.

4. The method of claim 1 wherein said signal is detected at a minimum of five different positions at the surface of the earth.

5. In a rotary method of drilling a borehole in the earth in which a drill bit is suspended from a drill string and rotated while circulating a drilling fluid through the drill string, drill bit, and up the annulus between the drill bit and borehole and wherein an acoustic vibration oscillator is operated near the bottom of the borehole to produce a waveform of acoustic vibrations of predominantly a single frequency in the borehole fluid, said acoustic vibration oscillator being adapted to be operated by a portion of the fluid pumped down the drill string and having an output to be acoustically coupled with a selected acoustic cavity, a portion of which is defined by the walls of the borehole, the method of determining the position of the drill bit, comprising the steps of:

at the surface, simultaneously detecting the waveform of acoustic vibrations at a plurality of different positions spaced apart sufficient to obtain phase differences in the waveform of acoustic vibrations detected at said different positions;

recording the waveform of acoustic vibrations detected at each position; and comparing the waveforms recorded to determine phase differences of the waveform of acoustic vibrations detected at said different positions.

6. The method of claim 5 wherein said acoustic vibration oscillator is operated and the waveform of acoustic vibrations produced are detected at the surface by said detecting means while the drill bit is rotated for drilling purposes.

7. The method of claim 5 comprising the step of:

stopping the rotation of the drill bit while the waveform of acoustic vibrations produced are detected at the surface by said detecting means.

recording the waveform of acoustic vibrations detected at each position; and comparing the waveforms recorded to determine phase differences of the waveform of acoustic vibrations detected at said different positions.

8. A system for surveying a borehole, comprising:

an acoustic vibration oscillator capable of generating acoustic vibrations of predominantly a single frequency and adapted to be operated by fluid pumped down a conduit and having an output to be acousticaly coupled with an acoustic cavity, a portion of which is defined by the walls of the borehole;

means for positioning the oscillator in the borehole;

means for pumping fluid down the conduit to the oscillator to generate acoustic vibrations of predominantly a single frequency;

a plurality of acoustic vibration detecting means located at different positions on the surface of the earth and spaced apart sufficient to obtain phase differences in the acoustic vibrations arriving at said different positions; and recording means for recording said phase differences.

9. The system of claim 8, wherein said recording means records waveforms of the detected acoustic vibrations and means for comparing the waveforms of the acoustic vibrations recorded are provided to determine said phase differences.

10. In a rotary drilling system wherein a drill bit is suspended from a drill string and rotated while circulating a drill fluid through the drill string, drill bit, and up the annuls between the drill bit and borehole and wherein an acoustic vibration oscillator is operated near the bottom of the borehole to produce acoustic vibrations of predominantly a single frequency in the borehole fluid, said acoustic vibration oscillator being adapted to be operted by the fluid pumped down the drill string and having an output to be acoustically coupled with an acoustic cavity, a portion of which is defined by the walls of the borehole, the combination therewith of:

a plurality of acoustic vibration detecing means located at different positions at the surface of the earth and spaced apart sufficient to obtain phase difference in the acoustic vibrations detected at said plurality of different positions; and recording means for recording the acoustic vibrations detected by said plurality of detecting means.

11. The system of claim 10, comprising:

means for comparing the acoustic vibrations recorded to determine phase differences in the acoustic vibrations as detected by said plurality of spaced detecting means.

* * * * *